March 24, 1959  C. L. SARVER  2,879,080
TRACTOR HITCH ASSEMBLY
Filed May 23, 1957  2 Sheets-Sheet 1
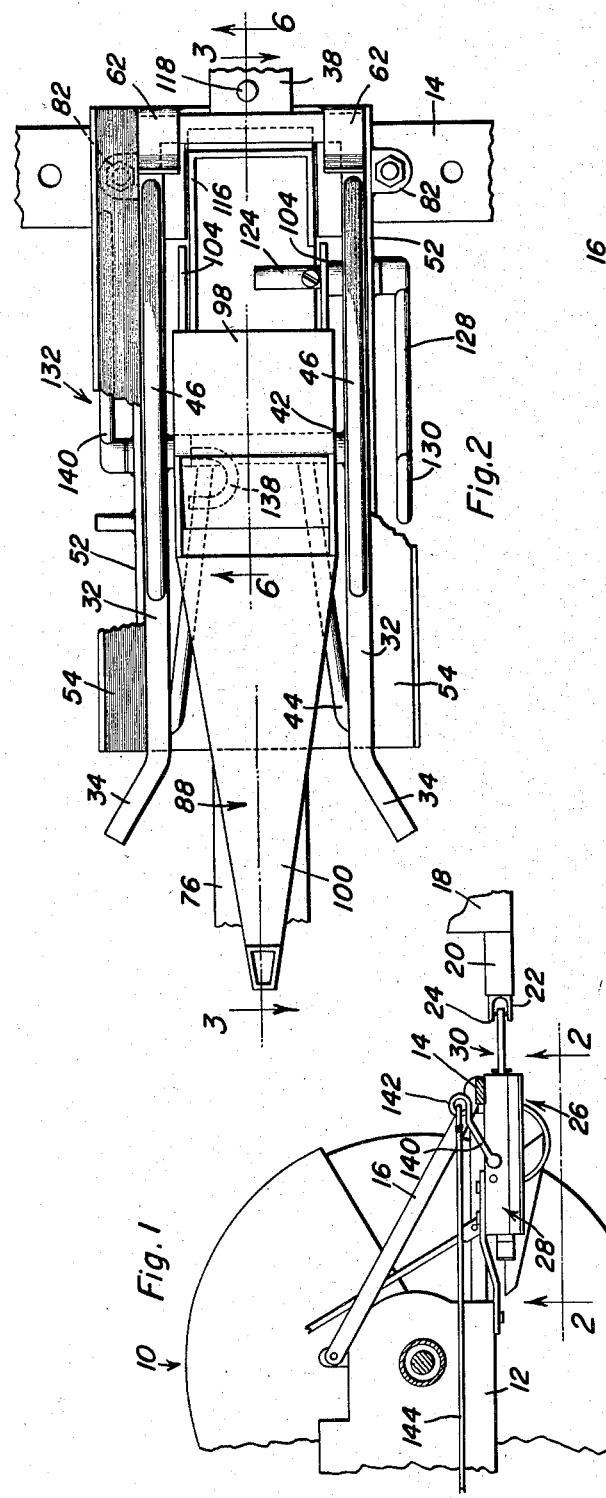
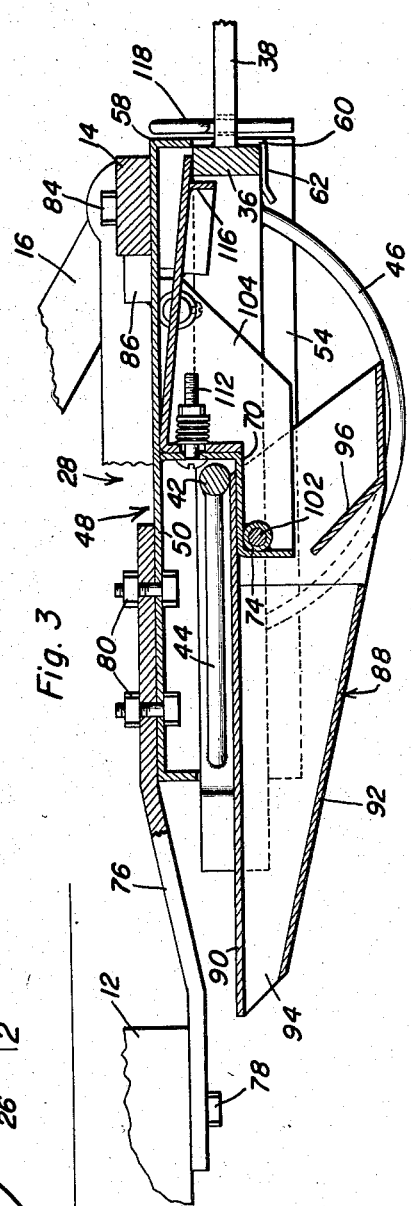
Carter L. Sarver
INVENTOR.

March 24, 1959   C. L. SARVER   2,879,080
TRACTOR HITCH ASSEMBLY
Filed May 23, 1957   2 Sheets-Sheet 2
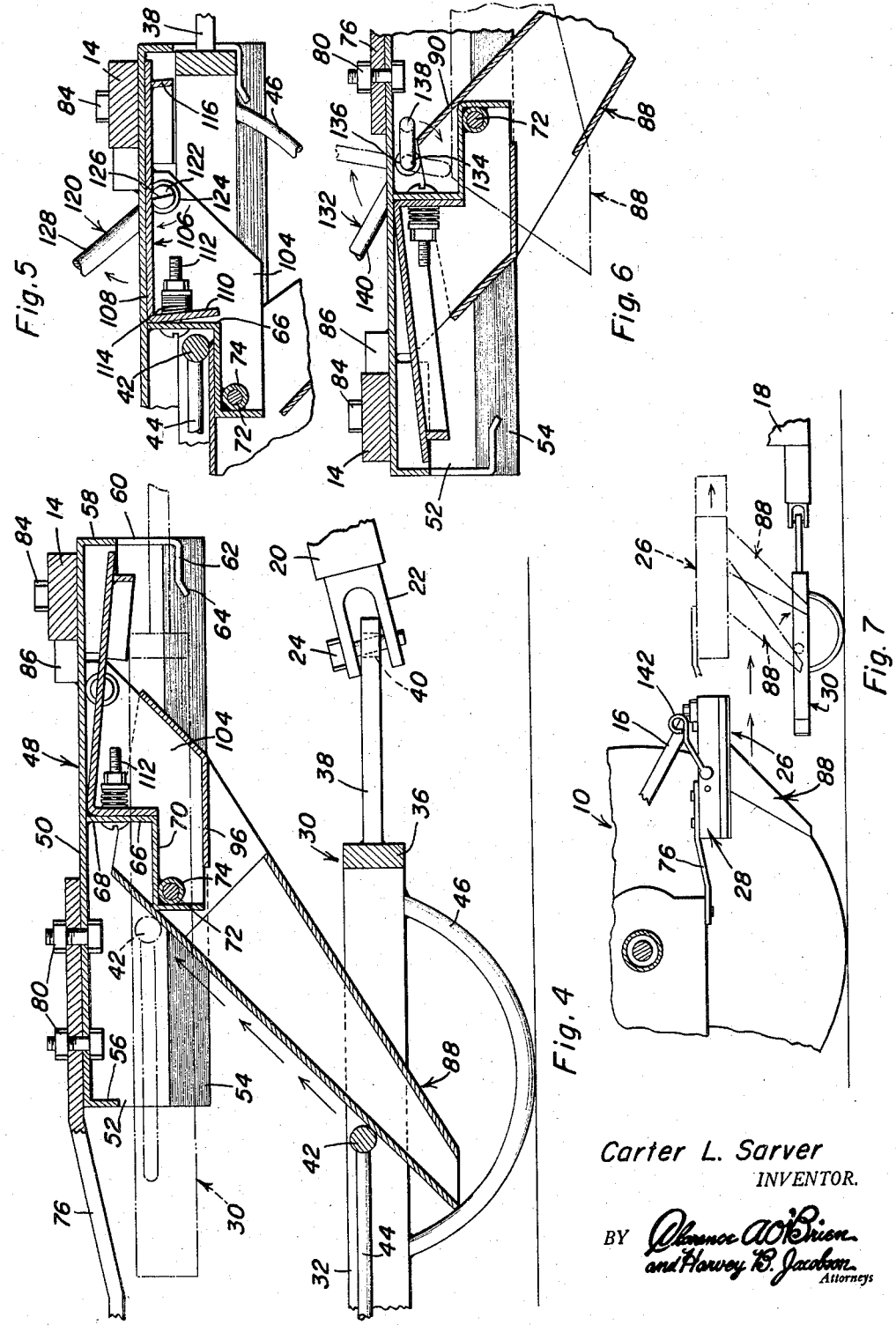
Carter L. Sarver
INVENTOR.

United States Patent Office 2,879,080
Patented Mar. 24, 1959

2,879,080

TRACTOR HITCH ASSEMBLY

Carter L. Sarver, Princeton, Ill.

Application May 23, 1957, Serial No. 661,176

5 Claims. (Cl. 280—478)

This invention relates in general to new and useful improvements in hitch assemblies, and more specifically to an improved hitch assembly for attaching implements to tractors in towing relation.

Normally when it is desired to couple a farm implement to a tractor, it is necessary for the operator of the tractor to carefully position the tractor with respect to the forward end of the tongue of the implement. Then it is necessary for the operator of the tractor to dismount from the tractor and properly position the tongue with respect to the drawbar of the tractor. Often the tongue of an implement has a load placed thereupon and as a result it is necessary for the operator of the tractor to exert quite a large amount of effort in positioning the tongue with respect to the draw bar. Further, the operator of the tractor cannot always accurately align the drawbar with the tongue with the result that it is necessary for the operator of the tractor to pull or push the implement so as to permit the proper relation between the tongue and the drawbar for coupling. This, obviously, is undesirable.

It is therefore the primary object of this invention to provide a tractor hitch assembly which is of such a nature whereby the operator of a tractor may while still mounted on the tractor couple the implement desired to the tractor.

Another object of this invention is to provide a tractor hitch assembly which includes a drawbridge having means for attaching it to a tongue of an implement, and a hitch unit having means for attachment to a tractor drawbar, the hitch unit including a depending finger which will automatically engage the drawbridge and elevate the drawbridge into locking relation with a frame of the hitch unit.

Still another object of this invention is to provide an improved hitch assembly for tractors, the hitch assembly being of such a nature whereby it may be readily mounted on existing tractor drawbars and may be connected to any of the conventional type of farm implement tongues without any modifications whatsoever to the tractor drawbar or the tongue and which when used will permit the automatic coupling and uncoupling of the implement to the tractor while the operator of the tractor remains mounted thereon.

A further object of this invention is to provide an improved tractor hitch assembly for automatically coupling implements to tractors, the tractor hitch assembly including means for elevating a drawbridge carried by an implement tongue and for automatically interlocking such drawbridge with the frame of the hitch unit, the hitch unit also including means for additionally latching the drawbridge to the frame thereof and means for permitting the releasing of the latch means from the operator's seat of the tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary side elevational view of a tractor and an implement drawn thereby and shows the general position of the tractor hitch assembly which is the subject of this invention, one wheel of the tractor being omitted for purposes of clarity and the drawbar being shown in section;

Figure 2 is an enlarged fragmentary sectional view taken substantially upon the plane indicated by the section line 2—2 of Figure 1 and shows the details of the tractor hitch assembly when viewed from the underside thereof, portions of a frame of the hitch unit being broken away to show the details of control levers carried thereby;

Figure 3 is an enlarged longitudinal sectional view taken substantially upon the plane indicated by the section line 3—3 of Figure 2 and shows the specific relationship between the drawbridge and the hitch unit when the two are interconnected;

Figure 4 is a sectional view similar to Figure 3 and shows the tractor hitch assembly in initial coupling position in solid lines and in the coupled position in dot-dash lines;

Figure 5 is an enlarged fragmentary sectional view taken through the rear part of the hitch assembly and shows the details of the latch between the drawbridge and the hitch unit, the latch member provides means being shown in a released position;

Figure 6 is an enlarged fragmentary sectional view taken substantially upon the plane indicated by the section line 6—6 of Figure 2 and shows the details of means for elevating the lifting finger of the hitch unit to a retracted position from the operator's seat of the tractor; and Figure 7 is a side elevational view similar to Figure 1 and shows schematically the various steps in the operation of the tractor hitch assembly.

Referring now to the drawings in detail, it will be seen that there is illustrated in Figure 1 primarily a tractor which is referred to in general by the reference numeral 10. For the purpose of this invention, it is only necessary to consider the fact that the tractor 10 includes a rear frame portion 12 and a transverse drawbar 14 which is carried by lifting arms 16. Associated with the tractor 10 is an implement 18 which has a tongue 20. The forward end of the tongue 20 includes a bifurcated hitch member 22 which carries a pin 24, the pin 24 normally being used to connect the hitch member 22 to the drawbar 14. The implement 18 is connected to the tractor 10 by means of the tractor hitch assembly which is the subject of this invention, a tractor hitch assembly being referred to in general by the reference numeral 26.

The tractor hitch assembly 26 includes a hitch unit, which is referred to in general by the reference numeral 28, and a drawbridge, which is referred to in general by the reference numeral 30. The hitch unit 28 is carried by the tractor 10 and the drawbridge 30 is carried by the tongue 20.

The drawbridge 30 includes a pair of longitudinally extending frame rails 32 which are transversely spaced and which have diverging forward ends 34, as is best shown in Figure 2. The lower ends of the frame rails 32 are connected together by a second cross member 36 which has secured to the central portion thereof a tongue 38. The tongue 38 extends rearwardly and is provided in the rear portion thereof with a vertical bore 40 carrying the hitch pin 24. This is best shown in Figure 4.

The drawbridge 30 also includes a first cross member 42 which extends between intermediate portions of the frame rails 32. Associated with the frame rails 32 and the first cross member 42 are rearwardly converging guide members 44 whose positions are best illustrated in Figure 2. The cross member 42 as well as the cross member 36 are retained in elevated positions by ground engaging supports 46 secured to the undersides of the frame rails 32 and depending therefrom.

The hitch unit 28 includes a frame which is referred to in general by the reference numeral 48. The frame 48 includes primarily a channel-shaped member which includes a top wall 50 and depending side flanges 52. The side flanges 52 terminate in outwardly flared lower portions 54. Depending from the top wall 50 at the forward edge thereof is a transverse flange 56 which is relatively narrow. A similar flange 58 depends from the rear edge of the top wall 50. The flange 58 is provided at opposite ends thereof with depending arms 60 which terminate in forwardly extending fingers 62 having downwardly sloping forward portions 64.

The frame 48 also includes a generally Z-shaped member which depends from the top wall 50 and extends between the side flanges 52. The Z-shaped member is disposed in the central portion of the channel-shaped member and includes an upper vertical flange 66 whose upper edge is secured as at 68 to the underside of the top wall 50. Formed integral with the lower edge of the flange 66 is a forwardly extending horizontal flange 70. A lower vertical flange 72 is disposed at the forward edge of the horizontal flange 70. Disposed in the angle formed by flanges 70 and 72 is a bearing sleeve 74 whose purpose will be set forth in more detail hereinafter.

In order that the frame 48 may be attached to the tractor 10, there is provided an offset strap 76. The strap 76 is secured to the underside of the frame 12 by a fastener 78. Similar fasteners 80 are used to secure the strap 76 to the forward part of the top wall 50.

The frame 48 is also secured to the drawbar 14. This is accomplished by means of ears 82 carried by the side flanges 52 along the rear part thereof. Fasteners 84 pass through the ears 82 and the drawbar 14. Further, a top wall 50 is provided with a pair of positioning lugs 86 which engage the forward edge of the drawbar 14 and imparts the rearward force exerted on the hitch unit 28 to the drawbar 14. Carried by the frame 48 for pivotal movement is a lifting finger 88. The lifting finger 88 is of a hollow construction and includes an upper wall 90, a lower wall 92 and side walls 94, the side walls 94 connecting the upper wall 90 and the lower wall 92. A portion of the lower wall 92 is struck out to form an upwardly projecting flange 96. As is best shown in Figure 2, the lifting finger 88 has a rear portion 98 which is of a constant width and a forward portion 100 which converges forwardly.

Extending between the side walls 94 and in spaced relation below the upper wall 90 is a pivot pin 102. The pivot pin 102 passes through the bearing sleeve 74 and serves to pivotally mount the lifting finger 88 on the frame 28.

At this time it is pointed out that the Z-shaped frame member is reinforced by a pair of side plates 104 which are best shown in Figure 2. The side plates 104 extend rearwardly from the Z-shaped frame member and are disposed inwardly of the side flanges 52, as is best shown in Figure 2. When the lifting finger 88 is in an elevated position, the upper wall 90 thereof overlies the horizontal flange 70. On the other hand, when the lifting finger 88 swings downwardly into an initial drawbridge engaging position, the flange 96 engages the lower edges of the side plates 104 and limits the downward movement of the lifting finger 88 to the position illustrated in Figure 4.

When the drawbridge 30 is interlocked with the hitch unit 28, the cross member 42 overlies the lifting finger 88 and retains it in its elevated position. Further, the cross bar 36 overlies and rests upon the fingers 62 and bear against the arms 60. This is best shown in Figure 5. In order that the drawbridge 30 may be latched in this position, there is carried by the vertical flange 66 a latch member 106. The latch member 106 includes a horizontal portion 108 and a depending forward flange 110. The flange 110 normally abuts the flange 66 and is retained in place by a fastener 112. The fastener 112 has mounted thereon a spring 114. The spring 114 is of a tension sufficient to normally retain the latch member 106 in an operative position, such as that shown in Figure 3, and at the same time permit the latch member 106 to be swung upwardly to an inoperative position, such as that shown in Figure 5.

The latch member 106 also includes a keeper portion 116 disposed at the rear part thereof. The keeper member 116 is generally U-shaped in outline and is engageable between the side rails 32 and forwardly of the cross member 36.

At this time it is pointed out that the tongue 38 extends rearwardly between the arms 60 and if desired, may be provided with a lock pin 118. The lock pin 118 will be disposed rearwardly of the flange 58 and engageable with the flange 58 to prevent forward movement of the drawbridge member 30 as is necessary to uncouple the drawbridge 30 from the hitch unit 28. The pin 118 is not necessary but is a safety feature which should be used.

In order that the latch member 106 may be moved to an inoperative position, such as that shown in Figure 5, by the operator of the tractor 10 without dismounting therefrom, there is provided an operator which is referred to in general by the reference numeral 120. The operator 120 includes a shaft 122 which is suitably journaled in a bushing 124 carried by one of the side plates 104. The shaft 122 has a flat end portion 126 which normally engaged the underside of the latch member 106, as is best shown in Figure 4. However, when the shaft 122 is rotated, as is best shown in Figure 5, it will cam the latch member 106 upwardly to an inoperative position. The operator 120 also includes a crank arm 128 which normally extends forwardly in a horizontal position and is provided with a lifting eye 130 which may be engaged with a trip rope (not shown) for manipulation by the operator of the tractor.

In order that the lifting finger 88 may be retracted as desired by the operator of the tractor without dismounting, there is provided a lever assembly which is referred to in general by the reference numeral 132. The lever assembly 132 includes a shaft 134 which is horizontally disposed and which is journaled in a sleeve 136 extending between one of the side plates 104 and associated one of the side flanges 52. The shaft 134 is provided with an offset end portion 138 which normally overlies the rear part of the upper wall 90 of the lifting finger 88. Connected to the shaft 134 is a control arm 140 which normally extends rearwardly and which terminates in an eye 142 to which there is connected a trip rope 144. By operating the lever assembly 132, the offset end portion 138 of the shaft 134 will engage the upper wall 90 of the lifting finger 88 and pivot it to the horizontal position. When the trip rope 144 is pulled, the end portion 138 moves to an over-center position and returns the lifting finger 88 in its retracted position.

*Operation*

When the implement 18 is not in use, the drawbridge 30 is resting upon the ground, as is best shown in Figure 7. It is then necessary for the operator of the tractor 10 to back the tractor 10 up towards the implement 18 with the lifting finger 88 in a depending position. While a certain degree of care must be taken in aligning the tractor 10 with the implement 18, because of the fact that the lower end of the lifting finger 88 is relatively narrow and the side rails of the drawbridge 30 are outwardly flared at the forward ends, the lifting finger 88 may be easily positioned with respect to the drawbridge 30. Continued rearward movement of the tractor 10 results in the lifting finger 88 engaging and riding over the first cross member 42. Once the lower end of the lifting finger 88 is positioned between the cross members 42 and 36, the direction of the tractor 10 is reversed and the tractor 10 is moved forwardly.

Referring now to Figure 4 in particular, it will be seen that inasmuch as the lifting finger 88 cannot move rearwardly from its position illustrated, and since the upper wall 90 thereof slopes upwardly and rearwardly, the tendency of the cross bar 42 is to slide upwardly along the lift finger 88 with the result that the drawbridge 30 is elevated into the general confines of the frame 48 of the hitch unit 28. Once the drawbridge 30 reaches the horizontal position illustrated in dotted lines in Figure 4, further forward movement of the tractor 10 will result in the rearward shifting of the drawbridge 30 with respect to the frame 48 and the engagement of the cross member 36 with the arm 60 and the fingers 62. The latch 106 will then engage the cross member 36 so as to retain the drawbridge 30 in interlocked relation with the hitch 28. At this time, if it is desired, the pin 118 will be positioned.

If it is desired to release the implement 18, it is merely necessary to position the implement 18 as is desired and then with the latch member 106 released, the tractor 10 is backed up. This will result in the additional forward sliding movement of the drawbridge 30 with respect to the frame 48 and then downward sliding thereof along the lifting finger 88 until the drawbridge 30 engages the ground. The tractor 10 is then continued to be backed up until the lifting finger 88 engages the cross member 36. At this time, the lever assembly 132 is actuated to elevate the lifting finger 88 within the confines of the frame 48. The lifting finger 88 so elevated, the hitch unit 28 is entirely separated from the drawbridge 30 and the tractor 10 may move forwardly independent of the implement 18.

From the foregoing, it will be readily apparent that there has been devised a tractor hitch assembly which, while of a two-piece construction, may be readily mounted both on a tractor and a desired implement and once mounted is so constructed whereby the operator of the tractor may couple the tractor to the implement without dismounting therefrom. This not only eliminates the necessity of the operator of this mounting tractor, but also eliminates the usual efforts on the part of the operator of the tractor in trying to properly align and connect the implement to the drawbar of the tractor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hitch assembly for attaching implements in towing relation to a tractor, said hitch assembly comprising a drawbridge, means for attaching said drawbridge to an implement tongue, said drawbridge including first and second cross members and depending ground engageable support members for retaining said cross members in elevated positions, and a hitch unit, said hitch unit including a frame, means on said frame for securing said frame to a tractor, a lifting finger, pivot means carried by said frame pivotally mounting said lifting finger for movement between a depending position to a horizontal position generally within said frame, said lifting finger having an upper surface engageable with said first cross member for elevating said drawbridge relative to said frame, and latch means on said frame engageable with said second cross member to retain said drawbridge interlocked with said hitch unit, said pivot means being disposed below and rearwardly of an upper part of said lifting finger upper surface whereby said first cross member, when it slides up said lifting finger, reaches an over-center position and then raises said lifting finger and interlocks with said frame.

2. A hitch assembly for attaching implements in towing relation to a tractor, said hitch assembly comprising a drawbridge, means for attaching said drawbridge to an implement tongue, said drawbridge including first and second cross members and depending ground engageable support members for retaining said cross members in elevated positions, and a hitch unit, said hitch unit including a frame, means on said frame for securing said frame to a tractor, a lifting finger, pivot means carried by said frame pivotally mounting said lifting finger for movement between a depending position to a horizontal position generally within said frame, said lifting finger having an upper surface engageable with said first cross member for elevating said drawbridge relative to said frame, and latch means on said frame engageable with said second cross member to retain said drawbridge interlocked with said hitch unit, said drawbridge including side rails having diverging forward ends and said lifting finger being tapered and having a narrow forward end to facilitate engagement of said lifting finger with said first cross member.

3. A hitch assembly for attaching implements in towing relation to a tractor, said hitch assembly comprising a drawbridge, means for attaching said drawbridge to an implement tongue, said drawbridge including first and second cross members and depending ground engageable support members for retaining said cross members in elevated position, and a hitch unit, said hitch unit including a frame, means on said frame for securing said frame to a tractor, a lifting finger, pivot means carried by said frame pivotally mounting said lifting finger for movement between a depending position to a horizontal position generally within said frame, said lifting finger having an upper surface engageable with said first cross member for elevating said drawbridge relative to said frame, and latch means on said frame engageable with said second cross member to retain said drawbridge interlocked, with said hitch unit, said pivot means being disposed below and rearwardly of an upper part of said lifting finger upper surface whereby said first cross member, when it slides up said lifting finger, reaches an over-center position and raises said lifting finger and interlocks with said frame, remotely controlled means carried by said frame and engaged with said lifting finger for selectively urging said lifting finger to a raised position.

4. A hitch assembly for attaching implements in towing relation to a tractor, said hitch assembly comprising a drawbridge, means for attaching said drawbridge to an implement tongue, said drawbridge including first and second cross members and depending ground engageable support members for retaining said cross members in elevated position, and a hitch unit, said hitch unit including a frame, means on said frame for securing said frame to a tractor, a lifting finger, pivot means carried by said frame pivotally mounting said lifting finger for movement between a depending position to a horizontal position generally within said frame, said lifting finger having an upper surface engageable with said first cross member for elevating said drawbridge relative to said frame, and latch means on said frame engageable with said second cross member to retain said drawbridge interlocked with said hitch unit, said pivot means being disposed below and rearwardly of an upper part of said lifting finger upper surface whereby said first cross member, when it slides up and lifting finger, reaches an over-center position and then raises said lifting finger and interlocks with said frame, said drawbridge including side rails having diverging forward ends and said lifting finger being tapered and having a narrow forward end to facilitate engagement of said lifting finger with said first cross member.

5. A hitch assembly for attaching implements in towing relation to a tractor, said hitch assembly comprising a drawbridge, means for ataching said drawbridge to an implement tongue, said drawbridge including first and second cross members and depending ground engageable support members for retaining said cross members in elevated positions, and a hitch unit, said hitch unit including a frame, means on said frame for securing said frame to a tractor, a lifting finger, pivot means carried by said frame pivotally mounting said lifting finger for movement between a forwardly and downwardly depending position to a horizontal position generally within said frame, said lifting finger having an upper surface engageable with said first cross member for elevating said drawbridge relative to said frame, and latch means on said frame engageable with said second cross member to retain said drawbridge interlocked with said hitch unit, said pivot means being disposed below and rearwardly of an upper part of said lifting finger upper surface whereby said first cross member, when it slides up said lifting finger, reach an over-center position and then raises said lifting finger and interlocks with said frame.

References Cited in the file of this patent

UNITED STATES PATENTS

| | | |
|---|---|---|
| 2,444,575 | McElhinney | July 6, 1948 |
| 2,583,840 | Hawkins et al. | Jan. 29, 1952 |

FOREIGN PATENTS

| | | |
|---|---|---|
| 485,240 | Germany | Oct. 28, 1929 |
| 693,134 | Germany | July 3, 1940 |